United States Patent Office 3,493,215
Patented Feb. 3, 1970

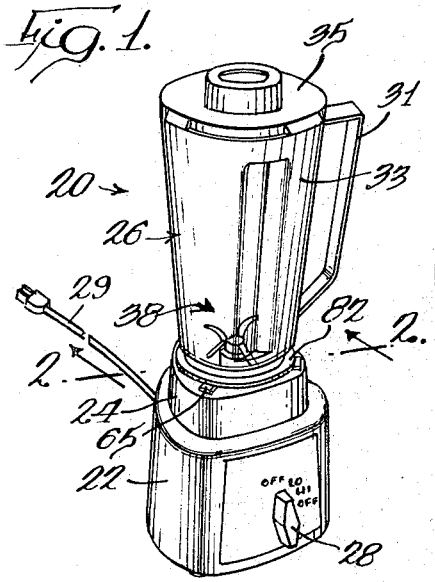

3,493,215
ELECTRIC BLENDER
Margaret M. Edwards, Milwaukee, and Lauren O. Main, Brown Deer, Wis., assignors to John Oster Manufacturing Co., Milwaukee, Wis., a corporation of Wisconsin
Filed Mar. 25, 1968, Ser. No. 715,697
Int. Cl. B01f 7/16
U.S. Cl. 259—108          9 Claims

ABSTRACT OF THE DISCLOSURE

An electric blender provided with a mixing vessel having a removable agitator assembly positioned at its bottom end. The agitator assembly includes an integral or one-piece member comprising a portion which extends into the vessel to rotatably support the mixing blades and a diaphragm portion which extends radially from the first portion to form a closure for the bottom opening in the vessel. A detachable cap clamps the integral member in its operating position and also supports the vessel on a base holder by resting on spaced resilient pads attached to the holder.

BACKGROUND OF THE INVENTION

The present invention relates to electric blenders and, more particularly, to an improved blender which is inexpensively manufactured.

With respect to electric blenders, it is advantageous to have a mixing vessel which is open at both ends with the upper end for receiving the ingredients to be placed in the vessel. Normally, a removable cover is provided to close the upper end when the blender is being used to prevent the agitated contents of the vessel from spewing out. The bottom opening of the blender vessel is closed by an easily removable agitator assembly which, in operation, mixes the contents of the vessel. For facilitating the cleaning of the vessel and agitator assembly after use, it is desirable for these components to be easily separated. Thus, when cleaning, the vessel is open at both ends allowing the cleaning liquid to pass directly therethrough and flush the internal vessel surface. Moreover, the agitator assembly, which normally consists of a plurality of radially extending blades, can be cleaned more easily if it is not located at the bottom of the vessel. However, making the agitator assembly easily separable from the vessel creates a sealing problem to insure that the contents of the vessel do not leak past the agitator assembly onto the blender base which supports the vessel. Therefore, it would be highly desirable to have an agitator assembly which can be easily attached to the bottom of the vessel in a manner to prevent a leaking problem and which, at the same time, is inexpensive to manufacture.

Inasmuch as it is necessary that the mixing vessel be removable from the blender base, a coupling arrangement between these two parts is utilized, and normally, this coupling is expensive to manufacture since the base contains a motor which must be placed in power transmitting relationship with the vessel agitator assembly. In most instances, the vessel is made to accurately mate with a holding means on top of the blender base so that the agitator assembly can be precisely oriented. However, due to an accumulation of assembly tolerances of the various parts, it is necessary for the motor driving element to be floatingly mounted with respect to the vessel holding means so that an effective engagement can always be made with the agitator assembly with the coupling members accurately aligned axially. Obviously, this arrangement is expensive to manufacture, and accordingly, there is a need for a motor driving element which may be simply and accurately positioned with respect to the agitator assembly and for a vessel supporting and holding means which will accurately locate the coupling of the agitator assembly with respect to the motor driving element in a manner which may be economically manufactured.

SUMMARY OF THE INVENTION

The present invention relates to an electric blender mixing vessel having an easily removable agitator assembly including an inexpensive, one-piece, integral member extending into the vessel to support the mixing blades for rotation and also extending across the bottom vessel opening to close the same. This member, when subjected to an upwardly directed force, insures a good sealing relationship with the vessel to prevent the leakage of its contents through the bottom. Additionally, the agitator assembly is removably mounted to the motor containing base by engagement wtih a plurality of supporting resilient pads which permit lateral movement of the vessel so that the agitator assembly can be properly oriented with respect to the motor driving element.

Accordingly, it is an object of the present invention to provide an improved electric blender having a mixing vcessel with an agitator assembly which is inexpensively manufactured and provides a good sealing arrangement with the vessel to prevent the leakage of the vessel contents through the bottom of the vessel.

Another object of the present invention is to provide an electric blender vessel with an agitator assembly which is easily mounted to the blender base, and the coupling therebetween is inexpensively manufactured.

Further objects and advantages of the present invention will become apparent as the following description proceeds, and the features of novelty which characterize the invention will be pointed out with particularity in the claims annexed to and forming a part of this specification.

DESCRIPTION OF THE DRAWING

For a better understanding of the present invention, reference may be had to the accompanying drawing in which:

FIG. 1 is a perspective view of an electric blender embodying the present invention having a portion of the power cord cut away for convenience of illustration;

FIG. 2 is an enlarged fragmentary sectional view taken substantially on line 2—2 of FIG. 1;

FIG. 3 is a sectional view taken substantially on line 3—3 of FIG. 2 assuming that FIG. 2 shows the complete structure;

FIG. 4 is a side elevational view of a resilient pad removed from the base holder; and FIG. 5 is a top plan view of the pad illustrated in FIG. 4.

DESCRIPTION OF THE PREFERRED EMBODIMENT

Referring now to the drawing wherein like reference characters designate corresponding parts throughout the several views, there is shown an electric blender generally designated by reference numeral 20. The blender 20 includes a base 22, a holder 24 mounted on top of said base and an easily removable mixing vessel assembly 26 insertable into the holder 24. As seen in FIG. 1, the base 22 has a selectable speed control knob 28 mounted on its front, and a power cord 29 emanates from the rear of the base. To facilitate the removal of the mixing vessel assembly 26 from the holder 24, a vertically extending handle 31 is integral with an open ended vessel 33. The top of vessel 33 is closed by cover 35 which prevents the contents of the vessel from spewing out through the top opening during the mixing operation. At the bottom of vessel 33 is agitator assembly 38 which performs the mixing and comminuting function.

Referring to FIG. 2, it may be seen that the base 22 includes a thin sheet metal cover 40 enclosing an electric motor 42 which is rigidly mounted to the holder 24 by means of a plurality of fastening elements 43. The electric motor 42 is provided with a housing 45 through the top of which extends a rotor shaft 47. At the upper end of rotor shaft 47 is driver 49 projecting above the base cover 40.

Preferably, the holder 24 is molded from a suitable plastic and includes an outer wall 52 having in the plan section a somewhat rounded triangular configuration, an upper wall 53 extending horizontally and inwardly from outer wall 52, a generally vertically inclined inner wall 54 and a central lower wall 55 having an aperture 56 through which the driver 49 extends. With this construction, the inner wall 54 and the lower wall 55 define a holder cavity 58 into which the vessel assembly 26 is insertable. The lower wall 55 is molded with an upstanding projection 60 extending radially between the aperture 56 and the inner wall 54. A plurality of spaced slots 62 extend vertically in inner wall 54 and upper wall 53. As can be conveniently seen in FIG. 3, the slots 62 are defined in part by two opposed vertical ribs 63 which are tapered so they are smaller at the upper end. Insertable into each slot 62 is a resilient pad 65 having a flat, upper surface 66, a tapered, curved front surface 67 and a tapered groove 68 extending vertically in each side. When inserted in place, pads 65 are oriented so that the slot ribs 63 are disposed in tapered grooves 68. Inasmuch as the resilient pads 65 are formed from resilient material, the tapered fit between the ribs 63 and grooves 68 provide a strong locking engagement. Preferably, there is a slight interference fit between the ribs 63 and the grooves 68 to insure that the pads 65 remain in their respective slot. In the present embodiment, three pads 65 are equally spaced on the holder 24 with the upper pad surface 66 lying in a substantially horizontal plane. It should be noted that the curved front pad surfaces 67 project inwardly into cavity 58 so that they extend therein further than the inner wall 54.

Receivable on the holder 24 is the mixing vessel assembly 26. As can be seen in FIG. 2, the vessel 33 has a lower neck portion 71 on the outside surface of which is formed a peripheral screw thread 72 ending adjacent to bottom edge 74 of the neck portion 71. The agitator assembly 38 is positioned adjacent to the vessel neck portion 71 and includes a member 75 which rotatably supports a driven shaft 77 carrying a plurality of mixing blades 78, a gasket 80 disposed between the member 75 and the vessel bottom edge 74 and an inverted cup-shaped cap 82 having internal threads 83 which are adapted to cooperate with neck portion threads 72 in order for the agitator assembly 38 to be easily and conveniently removed from the vessel 33. Preferably, member 75 is molded from a resilient plastic material and is formed to include a central bearing supporting or upright portion 85 which extends upwardly into the vessel neck portion 71 and an integral annular diaphragm portion 86 extending radially from the bearing portion 85 to a point contiguous with the vessel bottom edge 74. Disposed within the member bearing portion 85 are two conventional sleeve bearings 88 and 89 which rotatably support driven shaft 77. For the driver 49 to make a power transmitting connection with the agitator assembly 38, the driven shaft 77 is formed with a socket 91 at its bottom end. Adjacent to the bottom of bearing support portion 85 is annular shoulder 93 surrounding the drive shaft socket 91. The diaphragm portion 86 is molded with a plurality of upwardly projecting protuberances 94 spaced at varying distances from the upright portion 85 and spaced therearound for the purpose of removing material adhering to the blades 78 as they rotate.

It should be appreciated that the disc-shaped diaphragm portion 86 is sufficiently thin to permit the flexing thereof when an upwardly directed force is exerted upon the annular shoulder 93. The gasket 80 has a ring-shaped configuration and is preferably fabricated from a resilient pliable substance such as rubber or the like. The outside diameter of gasket 80 is approximately the same as the outside diameter of vessel neck portion 71 and diaphragm portion 86. With this construction, the gasket 80 is disposed between the vessel bottom edge 74 and the diaphragm portion 86. The use of the gasket 80 and the diaphragm portion 86 results in lessening the expense of making the vessel 26 and the member 75, since it is not necessary for the bottom vessel edge 74 to mate perfectly with the diaphragm portion 86 to establish a liquid tight seal for reasons explained hereinafter.

Removably holding the agitator assembly 38 to the vessel neck portion 71 is the cap 82 which is preferably molded from a suitable plastic material. Cap 82 is molded with a radially extending horizontal flange 95, a slightly tapered peripheral surface 96, a bottom wall 97 having a central opening 98 defined by an upwardly extending ledge 99 and a plurality of radially extending partitions 100 which depend from the bottom wall 97. As seen in FIG. 2, when the cap 82 is screwed onto the vessel neck portion 71, the upwardly extending ledge 99 engages the diaphragm portion shoulder 93 and forces it upwardly. It should be noted that the only force exerted upon the member 75 is along the annular shoulder 93 thereby flexing the resilient diaphragm portion 86 to provide effectively a uniform biasing force on the gasket 80 to compensate for any unevenness or non-uniformity between the vessel bottom edge 74 and the diaphragm portion 86. In this manner, it is not necessary for the vessel bottom portion 74 to correspond to the diaphragm portion 86 since the flexing of the diaphragm potrion forces it to conform to the vessel bottom edge. When the vessel assembly 26 is positioned in the holder cavity 58, the holder projection 60 is disposed between adjacent partitions 100 to limit the rotation of the vessel 26 with respect to the holder 24.

Upon inserting the vessel 26 into the holder 24, a cap flange 95 comes into contact with and rests upon resilient pads 65. Therefore, the depth of penetration of the vessel assembly 26 into the holder 24 is accurately controlled vertically by the engagement of the flange 95 and pads 65. Since the cap 82 is slightly smaller than the distance between the pads 65, lateral movement of the vessel assembly 26 is permitted to insure that the driven shaft socket 91 will receive the driver 49. The lateral movement of the vessel 26 is sufficient to overcome the displacement of the driven shaft socket from the axis of the driver 49 due to an accumulation of manufacturing tolerances. As can be seen in FIG. 2, the cap peripheral surface 96 is tapered to conform to the curved pad front surfaces 67 so that a uniform cap exists therebetween. Furthermore, the distance between the cap peripheral surface 96 and the pad front surface 67 is sufficiently small so that the cap peripheral surface cannot come into contact with the holder inner wall 54. Thus, the cap 82 comes into contact solely with the resilient pads 65 to dampen any vibration between the base 22 and the vessel assembly 26.

From the above, it should be apparent that the present blender has an agitator assembly which is easily removable from the vessel and which is inexpensive to manufacture. However, the removable agitator assembly is designed to insure that a good fluid seal is established between the assembly and the bottom of the mixing vessel. Furthermore, the manufacturing cost of the present blender is reduced by having the driver fixedly supported to the base and designing the vessel assembly 26 so that it may move laterally with respect to the driver to insure a proper power transmitting coupling is made when the vessel assembly is inserted onto the base holder.

What is considered new and desired to be secured by Letters Patent of the United States is:

1. In an electrical blender comprising a base containing an electric motor having a drive extending upwardly through said base, a holder mounted on said base and adapted for supporting a removable mixing vessel formed with a bottom end being open, agitator assembly securable to said vessel for mixing the contents thereof and engageable with said driver in a power transmitting relationship, said agitator assembly including an integral closure member closing said vessel bottom opening, said member being provided with an integral upright portion rotatably supporting blade means and an integral relatively thin diaphragm portion extending from said upright portion to adjacent the bottom of said vessel, gasket means disposed between the bottom of said vessel and said diaphragm portion, a cap removably secured to said vessel and being disposed for exerting an upwardly directed force on said member near said upright portion thereby clamping said gasket means between said diaphragm portion and the bottom of said vessel, said diaphragm portion being resilient for applying a substantially uniform load on said gasket in spite of unevenness in the gasket engaging surface of said vessel, said cap is formed with an outwardly projecting annular flange engageable with the top of said holder, said cap being adapted for lateral movement with respect to said holder so that said agitator can be properly aligned with said drive for a power transmitting engagement, said holder being provided with resilient pads, said cap having an annular side wall beneath said flange, said pads being engageable with both said cap flange and side wall.

2. In an electric blender comprising a base containing an electric motor having a driver extending upwardly through said base, a holder mounted on said base and adapted for supporting a removable mixing vessel formed with a bottom end being open, agitator assembly securable to said vessel for mixing the contents thereof and engageable with said driver in a power transmitting relationship, said agitator assembly including an integral closure member closing said vessel bottom opening, said member being provided with an integral upright portion rotatably supporting blade means and an integral relatively thin diaphragm portion extending from said upright portion to adjacent the bottom of said vessel, gasket means disposed between the bottom of said vessel and said diaphragm portion, a cap removably secured to said vessel and being disposed for exerting an upwardly directed force on said member near said upright portion thereby clamping said gasket means between said diaphragm portion and the bottom of said vessel, said diaphragm portion being resilient for applying a substantially uniform load on said gasket in spite of unevenness in the gasket engaging surface of said vessel, said holder is provided with an upstanding projection, said cap being formed to receive said holder projection when said vessel is supported by said holder for preventing the rotation of said cap with respect to said holder.

3. In the electric blender of claim 2 wherein said member diaphragm portion is formed with integral protuberance means extending toward said blade means for removing ingredients adhering to said blade means.

4. In an electric blender comprising a base having a holder mounted thereto, said holder forming a cavity, a mixing vessel being provided with a removable agitator assembly at its bottom which is insertable into said holder cavity, an electric motor mounted in said base and having a driver which is engageable with said agitator assembly, said agitator assembly including an annular flange extending radially therefrom and an annular side wall beneath said flange, said holder having spaced resilient pads, said flange being supportable on said pads and said side wall nested between said pads, said pads being space for permitting said side wall to move laterally so that said agitator assembly can be aligned with said driver.

5. In the electric blender of claim 4 wherein said holder being formed with vertically extending slots into which one of said pads is inserted, said slot arranged with vertically extending opposed ribs which are tapered with the smaller ends at the top, said pads being formed with a pair of opposed tapered grooves which are adapted to receive said ribs for locking said pad in said holder.

6. In the electric blender of claim 4 wherein said agitator assembly at its bottom defining a plurality of radially extending partitions, said holder including an upstanding projection which is insertable between adjacent partitions for permitting the rotation of said agitator assembly with respect to said holder when said vessel is inserted into said holder cavity.

7. In the electric blender of claim 4 wherein said pads are spaced on said holder so that when said vessel is being supported by said holder that said agitator assembly flange and side wall can only contact said resilient pads.

8. In the electric blender of claim 7 wherein said side wall being tapered and the portion of said pads coming into contact with said side wall having a complementary curved taper.

9. A mixing container for a blender comprising an upright vessel having an open top for introducing ingredients into the container and a bottom opening in which an agitator assembly is received, said assembly including a one piece molded plastic member having a rigid upright bearing portion and a thin resilient diaphragm portion extending outwardly normal to said upright bearing portion, bearing means received in said bearing portion for supporting therein a rotatable agitator shaft, said vessel being formed with a substantially planar sealing surface on the lower end thereof surrounding said opening, an annular gasket clamped between said surface and the periphery of said diaphragm, and a retaining cap threadedly received on the lower end of said vessel with inwardly extending means engaging said rigid bearing portion of said member whereby said resilient diaphragm exerts a force biasing said gasket into sealed engagement with the sealing surface on said vessel.

References Cited

UNITED STATES PATENTS

| 2,304,476 | 12/1942 | Poplawski | 259—108 |
| 2,530,455 | 11/1950 | Forss | 259—108 |
| 3,216,473 | 11/1965 | Dewenter | 259—108 |

ROBERT W. JENKINS, Primary Examiner

UNITED STATES PATENT OFFICE
CERTIFICATE OF CORRECTION

Patent No. 3,493,215                                      February 3, 1970

Margaret M. Edwards et al.

It is certified that error appears in the above identified patent and that said Letters Patent are hereby corrected as shown below:

Column 4, line 33, "potrion" should read -- portion --; line 74, "electrical" should read -- electric --; same column line 75 and column 5, line 24, "drive", each occurrence, should read -- driver --.

Signed and sealed this 1st day of December 1970.

(SEAL)
Attest:

Edward M. Fletcher, Jr.                    WILLIAM E. SCHUYLER,
Attesting Officer                              Commissioner of Patent